United States Patent Office 3,654,315
Patented Apr. 4, 1972

3,654,315
ORGANIC PSEUDO PERESTERS
Yun Ger Chang and Philip S. Bailey, Austin, Tex., assignors to Reichhold Chemicals, Inc., White Plains, N.Y.
No Drawing. Continuation-in-part of application Ser. No. 585,777, Oct. 11, 1966. This application June 3, 1969, Ser. No. 830,112
Int. Cl. C07d 5/06, 5/34
U.S. Cl. 260—343.3                 15 Claims

ABSTRACT OF THE DISCLOSURE

Organic pseudo peresters of the general formula:

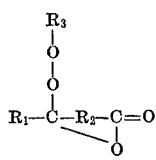

wherein $R_1$ is an alkyl group or an alkaryl group (aryl substituted alkyl) preferably containing no more than 12 carbon atoms or an aryl group with or without substituents; $R_2$ can be part of an aromatic nucleus with or without substituents or can be part of an alicyclic ring system or have the formula $(CH_2)_n$ wherein $n$ is an integer preferably in the range 2 to 4 and $R_3$ is an alkyl or alkaryl group preferably a tertiary alkyl or alkaryl group having utility as cross-linking agents, catalysts or initiators in polymerization reactions such as styrene vinyl acetate polyethylene and methyl methacrylate.

---

This application is a continuation-in-part of co-pending application Ser. No. 585,777, filed Oct. 11, 1966, now abandoned.

This invention relates to a class of novel peroxides and to methods for preparing them. Particularly, the invention relates to pseudo peresters of organic keto acids. More specifically, the invention is directed to a novel class of organic pseudo peresters of the general formula:

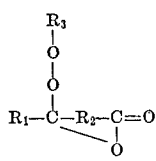

wherein $R_1$ is an alkyl group or alkaryl (aryl substituted alkyl) group preferably containing no more than twelve carbon atoms or an aryl group with or without substituents; $R_2$ can be an ortho phenylene or a substituted ortho phenylene or can be part of an alicyclic ring system or can have the formula $(CH_2)_n$ wherein $n$ is an integer preferably in the range 2 to 4 and $R_3$ is an alkyl group, preferably a tertiary alkyl or alkaryl group.

Preferably $R_1$ is a member of a group consisting of methyl, phenyl and methylphenyl; $R_2$ is a member of a group consisting of ethylene and ortho-phenylene and $R_3$ is a member of a group consisting of t-butyl, t-amyl and cumyl.

The invention also includes a process for preparing these novel pseudo peresters.

In the specification appended hereto the term "Pseudo Peresters," as used, represents a peroxy derivative of a keto acid which bears the same relationship to a normal keto perester that a pseudo ester bears to a normal keto ester.

These relationships are illustrated below:

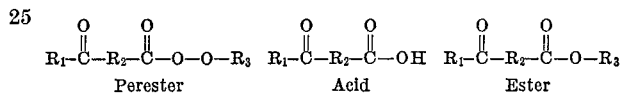
Perester    Acid    Ester

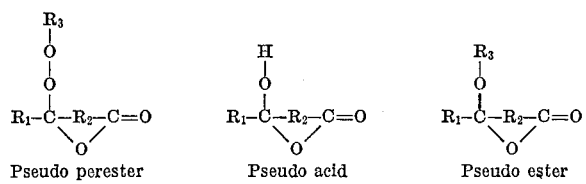
Pseudo perester    Pseudo acid    Pseudo ester

In accordance with this invention, pseudo peresters may be formed by reaction of halides of organic keto acids, which presumably have the pseudo structure, with organic hydroperoxides.

To assist in the reaction it has been found that an alkaline medium should be employed. Chemically it is believed that the alkaline medium aids the reaction by removing the inorganic acid formed during the reaction. The reaction is illustrated by the following equations:

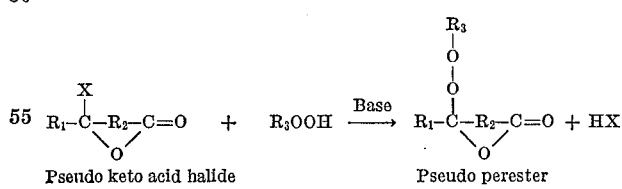
Pseudo keto acid halide    Pseudo perester

The above intermediate pseudo keto acid halides are readily obtained by treatment of the keto acids with such reagents as thionyl chloride, phosphorous trichloride, phosphorous pentachloride, phosphorous tribromide, etc.

It has been found that in the reaction between the pseudo acid halide and the hydroperoxides, the reaction temperature should be maintained between 10° C. and 60° C. although a temperature of about 10 to 30° C. is preferred since outstanding results are achieved within the latter temperature range.

As the keto acids there can be used any acid containing the >CO and —COOH radicals, such as the following gamma-keto acids:

levulinic,
2-benzoylbenzoic,
2-(2-methylbenzoyl)benzoic,
2-(4-methylbenzoyl)benzoic,
2-(2-ethylbenzoyl)benzoic,
2-(4-ethylbenzoyl)benzoic,
2-(2-isopropylbenzoyl)benzoic,
2-(2-n-butylbenzoyl)benzoic,
2-(4-n-butylbenzoyl)benzoic,
2-(4-sec-butylbenzoyl)benzoic,
2-(4-t-butylbenzoyl)benzoic,
2-(4-cyclohexylbenzoyl)benzoic
2-(5,6,7,8-tetrahydro-2-naphthoyl)benzoic,
2-(4-phenylbenzoyl)benzoic,
2-(1-naphthoyl)benzoic,
2-(2-chlorobenzoyl)benzoic,
2-(4-chlorobenzoyl)benzoic,
2-(2-bromobenzoyl)benzoic,
2-(4-bromobenzoyl)benzoic,
2-(2-methoxybenzoyl)benzoic,
2-(4-methoxybenzoyl)benzoic,
2-(2-isopropoxybenzoyl)benzoic,
2-(4-isopropoxybenzoyl)benzoic,
2-(4-t-butoxybenzoyl)benzoic,
2-(4-n-pentoxybenzoyl)benzoic,
2-(4-cyclohexoxybenzoyl)benzoic,
2-(4-phenoxybenzoyl)benzoic,
2-(2,4-dimethylbenzoyl)benzoic,
2-(3,4-dimethylbenzoyl)benzoic,
2-(2-methyl-4-ethylbenzoyl)benzoic,
2-(2-methyl-4-cyclohexylbenzoyl)benzoic,
2-(2-methyl-4-t-butylbenzoyl)benzoic,
2-(2-methyl-4-t-amylbenzoyl)benzoic,
2-(2,4-dichlorobenzoyl)benzoic,
2-(3,4-dichlorobenzoyl)benzoic,
2-(2,4-dibromobenzoyl)benzoic,
2-(3,4-dibromobenzoyl)benzoic,
2-(2,4-dimethoxybenzoyl)benzoic,
2-(3,4-dimethoxybenzoyl)benzoic,
2-(2,4,5-trimethylbenzoyl)benzoic,
2-(2,4,5-trichlorobenzoyl)benzoic,
2-(2,3,4,5-tetramethylbenzoyl)benzoic,
2-(2,3,4,5-tetrachlorobenzoyl)benzoic,
6-methyl-2-benzoylbenzoic,
6-methyl-2-(2-isopropylbenzoyl)benzoic,
6-methyl-2-(4-t-butylbenzoyl)benzoic,
6-methyl-2-(4-t-amylbenzoyl)benzoic,
6-methyl-2-(4-cyclohexylbenzoyl)benzoic,
6-methyl-2-(4-phenylbenzoyl)benzoic,
6-methyl-2-(4-chlorobenzoyl)benzoic,
6-methyl-2-(4-methoxybenzoyl)benzoic,
6-methyl-2-(4-phenoxybenzoyl)benzoic,
6-methyl-2-(2-methyl-4-ethylbenzoyl)benzoic,
6-methyl-2-(2,4-dichlorobenzoyl)benzoic,
6-methyl-2-(2,4-dimethoxybenzoyl)benzoic,
6-methyl-2-(2,4,5-trimethylbenzoyl)benzoic,
6-methyl-2-(2,4,5-trichlorobenzoyl)benzoic,
6-methyl-2-(2,3,4,5-tetramethylbenzoyl)benzoic,
3,6-dimethyl-2-benzoylbenzoic,
3,6-dimethyl-2-(2-methylbenzoyl)benzoic,
3,6-dimethyl-2-(4-isopropylbenzoyl)benzoic,
3,6-dimethyl-2-(4-cyclohexylbenzoyl)benzoic,
3,6-dimethyl-2-(4-methoxybenzoyl)benzoic,
3,6-dimethyl-2-(4-chlorobenzoyl)benzoic,
3,6-dimethyl-2-(2,4-dimethylbenzoyl)benzoic,
3,6-dimethyl-2-(2,4-dichlorobenzoyl)benzoic,
3,6-dimethyl-2-(2,4-dimethoxybenzoyl)benzoic,
3,5,6-trimethyl-2-benzoylbenzoic,
3,5,6-trimethyl-2-(2-methylbenzoyl)benzoic,
3,5,6-trimethyl-2-(2,4-dimethylbenzoyl)benzoic,
3,5,6-trimethyl-2-(2-chlorobenzoyl)benzoic,
3,5,6-trimethyl-2-(2,4-dichlorobenzoyl)benzoic,
3,5,6-trimethyl-2-(2-methoxybenzoyl)benzoic,
3,5,6-trimethyl-2-(2,4-dimethoxybenzoyl)benzoic,
3,4,5,6-tetrachloro-2-benzoylbenzoic,
3,4,5,6-tetraiodo-2-benzoylbenzoic,
3,4,5,6-tetraphenyl-2-benzoylbenzoic,
2-benzoyl-1-naphthoic,
2-benzoyl-1-naphthoic,
2-(2-methylbenzoyl)-1-naphthoic,
2-(2,4-dimethylbenzoyl)-1-naphthoic,
9-fluorenone-1-carboxylic acid, and the like Suitable monohydroperoxides are: t-butyl, t-amyl, 1,1,3,3-tetramethylbutyl, cumene, p-methylcumene, o-methylcumene, p-isopropylcumene, o-isopropylcumene, p-n-butylcumene, o-n-butylcumene, p-sec-butylcumene, o-sec-butylcumene, p-t-butylcumene, o-t-butylcumene, p-chlorocumene, o-chlorocumene, p-bromocumene, o-bromocumene, p-nitrocumene, o-nitrocumene, p-carboxycumene, o-carboxycumene, α-ethyl-α-methylbenzyl, phenylcyclohexyl, α-ethyl-α-methyl-m,m-di-sec-butylbenzyl,
m,m-dicyclohexylphenylcyclohexyl,
1,4,4-triethyl-1,2,3,4-tetrahydronaphthyl,
1,4,4-triisopropyl-1,2,3,4-tetrahydronaphthyl,
1,4,4-tri-sec-butyl-1,2,3,4-tetrahydronaphthyl,
1,4,4-tri-t-butyl-1,2,3,4-tetrahydronaphthyl,
1,4,4-tri-t-amyl-1,2,3,4-tetrahydronaphthyl,
1,3,3-trimethylindanyl,
triphenylmethyl hydroperoxide, and the like but the preferred hydroperoxides are t-butyl, t-amyl and cumene hydroperoxide, on account of the outstanding performance achieved through their use.

This novel class of peresters has been found to provide excellent cross-linking agents. They also have been found to be useful as catalysts or initiators in polymerization reactions such as the polymerization of styrene, vinyl acetate, polyethylene, methyl methacrylate, and the like.

In order to illustrate this invention more clearly, non-limiting examples of certain facets of this invention are now presented.

EXAMPLE I

First, levulinic acid was reacted with thionyl chloride in benzene to form levulinyl chloride as the necessary intermediate.

(1A) Preparation of levulinyl chloride

One hundred seventy-eight and one-half grams (1.50 moles) of thionyl chloride was dissolved in 500 ml. of benzene in a 1000-ml. flask fitted with a condenser. To the resulting solution was added 116.0 g. (1.00 mole) of levulinic acid. The reaction mixture was heated on a water-bath and refluxed overnight. The low-boiling materials in the mixture were removed under reduced pressure at 40–50° C. A dark, reddish-brown liquid product was obtained, weighing 132.0 g. (98.10% yield based on the levulinic acid used).

Then, t-butyl hydroperoxide was reacted with levulinyl chloride in the presence of a basic medium, such as pyridine, to produce pseudo t-butyl peroxylevulinate which was isolated as a colorless liquid. The base catalyzed reaction may be shown as follows:

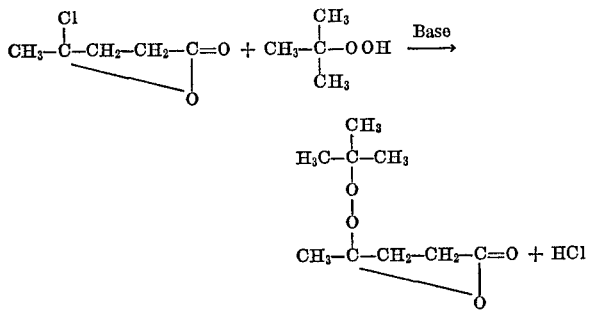

(1B) Preparation of pseudo t-butyl peroxylevulinate (5-t-butylperoxy-5-methyl-2-oxo-2,3,4,5-tetrahydrofuran)

To 132.0 g. (about 1 mole) of the crude levulinyl chloride obtained in the preceding experiment was slowly added a mixture of 100.0 g. (1.00 mole) of 90% t-butyl hydroperoxide and 79.0 g. (1.00 mole) of pyridine at 10–20° C. with agitation. The reaction mixture was stirred at room temperature for 2 hours and then allowed to stand overnight. It was then diluted with about 300 ml. of water. The resulting mixture was extracted 3 times with 200-ml. portions of ether. The ether extract was washed 3 times with water, 3 times with 50-ml. portions of saturated sodium bicarbonate solution and again 3 times with water. Finally the extract was dried with anhydrous magnesium sulfate. Filtration and removal of low-boiling materials under reduced pressure at 40–50° C. left a reddish-brown liquid weighing 124.0 g. (66.0% yield based on the levulinyl chloride used). The crude product contained 8.68% active oxygen determined by the hydriodic acid-sodium thiosulfate titration and 4.9% active oxygen shown by the potassium iodide-sodium thiosulfate titration (theoretically 8.51%). After being purified by two distillations at 55° C./1.0 mm., the colorless liquid contained 8.63% and 2.70% active oxygen determined by the treatment with hydriodic acid and by the treatment with potassium iodide solution, respectively. It had the constants $n_D^{25}$ 1.4348, $d_4^{25}$ 1.0440, MR (calcd.) 47.38, MR (obsd.) 47.04.

*Analysis.*—Calcd. for $C_9H_{16}O_4$ (percent): C, 57.41; H, 8.56 (molecular weight 188.2). Found (percent): C, 57.29; H, 8.20 (molecular weight 179).

The infrared spectrum of this compound showed a strong, broad band at 1740–1790 cm.$^{-1}$ due to a carbonyl group, a strong band at 1355–1375 cm.$^{-1}$ due to a —$C(CH_3)_3$ group, and a band at 865 cm.$^{-1}$ representing the peroxide group. The thin-layer chromatogram of this peroxide, obtained by using silica gel film and an acetone-carbon tetrachloride (1:2 by volume) mixture, as solvent, had one spot shown by the treatment with either hydriodic acid or potassium iodide solution. On the basis of these data this peroxide has the structure shown on the right side of the preceding equation.

EXAMPLE II

First, 2-benzoylbenzoic acid was reacted with thionyl chloride in benzene to form 2-benzoylbenzoyl chloride as the necessary intermediate.

(2A) Preparation of 2-benzoylbenzoyl chloride

Seventeen and eighty-five one-hundredths grams (0.15 mole) of thionyl chloride was dissolved in 50 ml. of benzene in a 200-ml. flask fitted with a condenser. To the resulting solution was added 22.6 g. (0.10 mole) of 2-benzoylbenzoic acid. The reaction mixture was heated on a water-bath and refluxed for 24 hours. The low-boiling materials present in the mixture were removed under reduced pressure at 40–50° C. A greenish-brown, thick, syrup-like residue was obtained, weighing 24.5 g. (100% yield based on the 2-benzoylbenzoic acid used).

Then, t-butyl hydroperoxide was reacted with the 2-benzoylbenzoyl chloride in the presence of a basic medium, such as pyridine, to produce pseudo t-butyl peroxy-2-benzoylbenzoate, which was isolated as a white solid. This base-catalyzed reaction may be shown as follows:

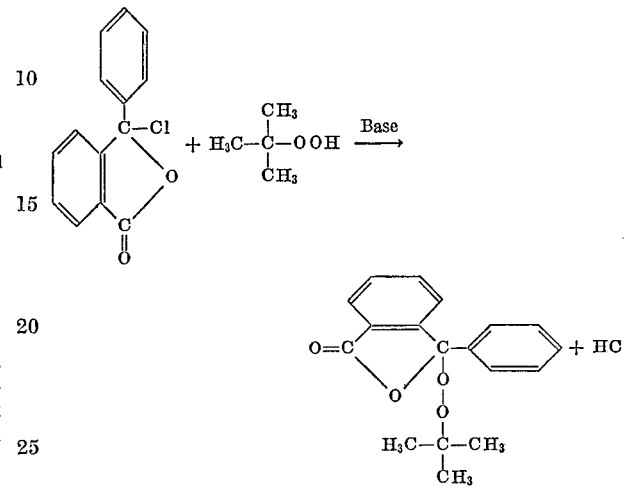

(2B) Preparation of pseudo t-butyl peroxy-2-benzoylbenzoate (5-t-butylperoxy-2-oxo-5-phenyl-2,5-dihydro-3,4-benzofuran)

To 12.3 g. (about 0.05 mole) of the crude 2-benzoylbenzoyl chloride, obtained in the preceding experiment, was added a mixture of 5.0 g. (0.05 mole) of 90% t-butyl hydroperoxide and 4.0 g. (0.05 mole) of pyridine at 10–20° C., with vigorous agitation. The reaction mixture was stirred at room temperature for 2 hours and then allowed to stand at this temperature overnight. It was diluted with about 30 ml. of water. The resulting mixture was extracted 3 times with 20-ml. portions of ether. The ether extract was washed 3 times with water, 3 times with 10-ml. portions of saturated sodium bicarbonate solution and again 3 times with water. Finally it was dried with anhydrous magnesium sulfate. Filtration and removal of low-boiling materials under reduced pressure at 40–50° C. left a very light-brown syrup-like product weighing 12.5 g. (83.90% yield based on the 2-benzoylbenzoyl chloride used). Five milliliters of ethyl alcohol containing a drop of pyridine was mixed with the thick syrup-like product. A fine, white, crystalline solid was slowly formed in the mixture. It was filtered off, washed with petroleum ether, and dried under reduced pressure. The crude solid product contained 4.40% active oxygen determined by the hydriodic acid-sodium thiosulfate titration and 1.04% active oxygen shown by the potassium iodide-sodium thiosulfate titration (theoretically 5.37%) and melted at 93–95° C. It was purified by recrystallization from hot petroleum ether boiling at 60–110° C. The pure compound contained 4.05% and 0.70% active oxygen determined by the treatments with hydriodic acid and potassium iodide, respectively. It melted at 118° C.

*Analysis.*—Calcd. for $C_{18}H_{18}O_4$ (percent): C, 72.47; H, 6.08; (molecular weight 298.3). Found (percent): C, 72.61; H, 5.93; (molecular weight 295).

The infrared spectrum of this compound showed a strong, broad band at 1735–1775 cm.$^{-1}$ due to a carbonyl group, a sharp band at 1360 cm.$^{-1}$ due to a —$C(CH_3)_3$ group, and a band at 858–865 cm.$^{-1}$ representing a peroxide group. The thin-layer chromatogram of this peroxide, obtained by using silica gel film and an acetone-carbon tetrachloride mixture (1:2 by volume) as solvent, had one spot shown by the treatment with hydriodic acid and no spot shown by the treatment with potassium iodide solution. On the basis of these data, this compound has the structure shown on the right side of the equation.

EXAMPLE III

This example is similar to Example 2B but shows the preparation of pseudo t-butyl peroxy-2-benzoylbenzoate via sodium hydroxide instead of pyridine.

A 30% aqueous solution containing 2.0 g. (0.05 mole) of sodium hydroxide was slowly added to 5.0 g. (0.05 mole) of 90% t-butyl hydroperoxide at 10–20° C., with agitation. A small amount of water was added to the mixture to completely dissolve the white solid. The resulting aqueous solution was slowly added to 12.4 g. (0.05 mole) of the crude pseudo chloride of 2-benzoylbenzoic acid at 15–20° C., with vigorous stirring. The reaction mixture was stirred at room temperature for 2 hours and then allowed to stand for 12 hours. After being diluted with 30 ml. of water, the reaction mixture was extracted 3 times with ether. Following the procedure described in Example II, a very light-brown, syrup-like product was obtained, weighing 13.2 g. (88.59% yield based on the amount of 2-benzoylbenzoic acid chloride used). Addition of 5 ml. of ethyl alcohol to the syrup-like product led to the formation of a white crystalline solid. The product contained 4.95% active oxygen determined by hydriodic acid-sodium thiosulfate titration, and was identified as the pseudo perester, 5-t-butylperoxy-2-oxo-5-phenyl-2,5-dihydro-3,4-benzofuran (pseudo t-butyl peroxy-2-benzoylbenzoate).

EXAMPLE IV

This example is similar to Example 1B except that sodium hydroxide was used instead of pyridine.

To 10.0 g. (0.10 mole) of 90% t-butyl hydroperoxide was added a 30% aqueous solution containing 4.0 g. of sodium hydroxide, with stirring. A small quantity of water was added to the mixture to dissolve the solid The resulting aqueous solution was very slowly added to 12.9 g. (about 0.10 mole) of the crude pseudo chloride of levulinic acid at 10–20° C., with stirring. The reddish-brown reaction mixture was stirred at room temperature for 2 hours, and then allowed to stand for 12 hours. The reaction mixture was diluted with 30 ml. of water and then extracted 3 times with ether. Following the procedure described in Example I, the pseudo perester, 5-t-butylperoxy-5-methyl-2-oxo-2,3,4,5-tetrahydrofuran, was obtained.

EXAMPLE V

Preparation of pseudo t-amyl peroxylevulinate (5-t-amyl-peroxy-5-methyl-2-oxo-2,3,4,5-tetrahydrofuran)

A solution of 7.9 g. (0.10 mole) of pyridine and 11.6 g. (0.10 mole) of 90% t-amyl hydroperoxide was slowly added to 12.9 g. (about 0.10 mole) of the crude pseudo chloride of levulinic acid at 10–20° C., with agitation, The reaction mixture was stirred at room temperature for 2 hours and then allowed to stand for 12 hours. After being diluted with 30 ml. of cold water, the reaction mixture was extracted 3 times with 20-ml. portions of ether. The ether extract was washed 3 times with water, 3 times with saturated sodium bicarbonate solution and again 3 times with water. Finally, it was dried with anhydrous magnesium sulfate. Filtration and removal of ether under reduced pressure left a brown liquid residue. The crude product was largely the pseudo perester of levulinic acid, 5-t-amyl-peroxy-5-methyl-2-oxo-2,3,4,5 - tetrahydrofuran, as shown by the analysis for its active oxygen content.

EXAMPLE VI

Preparation of psuedo cumyl peroxylevulinate (5-cumyl-peoxy-5-methyl-2-oxo-2,3,4,5-tetrahydrofuran)

To 12.9 g. (about 0.10 mole) of the crude pseudo chloride of levulinic acid was slowly added a solution of 7.9 g. (0.10 mole) of pyridine and 16.9 g. (0.10 mole) of 90% cumyl hydroperoxide at 10–20° C., with agitation. The reaction mixture was stirred at room temperature for 2 hours and then allowed to stand overnight. The reaction mixture was diluted with 30 ml. of water and extracted 3 times with 20-ml. portions of ether. Following the procedure described in Example I, the ether extract was washed and dried, and the ether was removed. A crude liquid product was obtained which was largely the pseudo cumyl perester of levulinic acid, 5-cumylperoxy-5-methyl-2-oxo-2,3,4,5-tetrahydrofuran, as indicated by the determination of its active oxygen content.

EXAMPLE VII

Preparation of pseudo t-butyl peroxy-2-(2-methylbenzoyl) benzoate [5-t-butylperoxy-2-oxo-5-(2-methylphenyl)-2, 5-dihydro-3,4-benzofuran]

Four grams (0.05 mole) of pyridine and 5.0 g. (0.05 mole) of 90% t-butyl hydroperoxide were mixed together at room temperature. To 13.0 g. (about 0.05 mole) of crude pseudo chloride of 2-(2-methylbenzoyl)-benzoic acid, which was produced from the reaction of 2-(2-methylbenzoyl)-benzoic acid with thionyl chloride, was added the resulting mixture at 15–20° C., with vigorous agitation. The reaction mixture was stirred at room temperature for 2 hours and then allowed to stand for 12 hours. It was mixed with 30 ml. of water. The resulting mixture was extracted 3 times with 20-ml. portions of ether. The ether solution was washed 3 times with water, 3 times with saturated sodium bicarbonate solution and again 3 times with water. Finally, it was dried with anhydrous magnesium sulfate. Filtration and removal of ether under reduced pressure left a viscous residue, which became a crystalline solid when treated with 5 ml. of ethyl alcohol. The crude solid product was benzoic acid, 5-t-butyl-peroxy-2-oxo-5-(2-methylphenyl)-2,5-dihydro-3,4 - benzofuran, as shown by the determination of its active oxygen content.

EXAMPLE VIII

Preparation of pseudo t-butyl peroxy-2-(2-ethyl-benzoyl)-benzoate

The chloride of 2-(2-ethylbenzoyl)-benzoic acid was prepared by refluxing a mixture of 25.40 g. (0.10 mole) of the acid, 17.85 g. (0.15 mole) of thionyl chloride and 100 ml. of benzene, for about twenty hours. The low-boiling materials present in the reaction mixture were thoroughly removed under reduced pressure, using a water aspirator and a rotating evaporator. A very viscous material was obtained in a quantitative yield based on the amount of the organic acid used for the reaction. The crude acid chloride was employed as a reactant in the following preparation.

A mixture of 10.00 g. (0.10 mole) of 90% t-butyl hydroperoxide and 7.90 g. (0.10 mole) of pyridine was added to 27.25 g. (0.10 mole) of the acid chloride prepared above, at 10–20° C., with powerful agitation. The reaction mixture was stirred at room temperature for two hours and then allowed to stand for about ten hours. It was diluted with 60 ml. of water. The resulting mixture was extracted three times with 50-ml. portions of ether. The ether extract was washed three times with 20-ml. portions of saturated sodium bicarbonate solution and twice with 50-ml. portions of water, and finally dried over anhydrous magnesium sulfate. Filtration and removal of low-boiling materials, under reduced presure using a water aspirator and a rotating evaporator, at about 40° C., gave a very viscous, light-brown, syrup-like product in an 85% yield based upon the amount of acid chloride used for the reaction. Addition of 10 ml. of ethyl alcohol to the viscous product led to the formation of a white crystalline solid. This solid was purified by crystallization from hot petroleum ether boiling at 60–110° C., and identified as the peroxide, pseudo t-butyl peroxy-2-(2-ethylbenzoyl)benzoate, represented by the following structural formula.

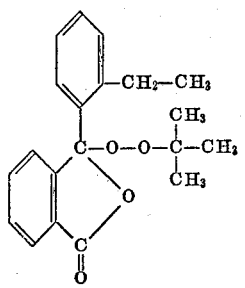

EXAMPLE IX

Preparation of pseudo t-amyl peroxy-2-(4-isopropylbenzoyl)benzoate

Following the procedure described in Example 1, the chloride of 2-(4-isopropylbenzoyl)benzoic acid was prepared by reacting 26.80 g. (0.10 mole) of the acid with 17.85 g. (0.15 mole) of thionyl chloride in 100 ml. of benzene.

To the crude acid chloride was added a mixture of 11.60 g. (0.10 mole) of 90% t-amyl hydroperoxide and 7.90 g. (0.10 mole) of pyridine, at 10–20° C., with agitation. In the same manner as described in Example 1, a white crystalline product was obtained and identified as the peroxide, pseudo t-amyl peroxy-2-(4-isopropylbenzoyl)benzoate, having the following structural formula.

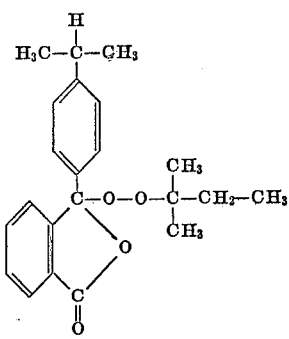

EXAMPLE X

Preparation of pseudo t-butyl peroxy-2-(4-t-butylbenzoyl)benzoate

The chloride of 2-(4-t-butylbenzoyl)benzoic acid was prepared in the same manner as described in Example 1, by reacting 28.20 g. (0.10 mole) of the acid with 17.85 g. (0.15 mole) of thionyl chloride in benzene.

A mixture of 10.00 g. (0.10 mole) of 90% t-butyl hydroperoxide and 7.90 g. (0.10 mole) of pyridine was added to the crude acid chloride at 10–20° C., with powerful agitation. Following the procedure described in Example 1, a peroxide was obtained as white crystalline solid, and identified as pseudo t-butyl peroxy-2-(4-t-butylbenzoyl)benzoate, represented by the structure shown below.

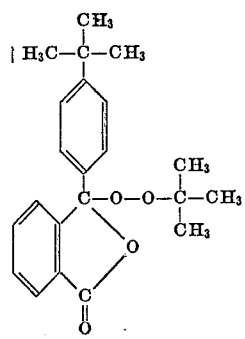

EXAMPLE XI

Preparation of pseudo cumyl peroxy-2-(4-cyclohexylbenzoyl)benzoate

Following the procedure described in Example 1, the reaction of 30.80 g. (0.10 mole) of 2-(4-cyclohexylbenzoyl)benzoic acid with 17.85 g. (0.15 mole) of thionyl chloride in benzene gave the corresponding acid chloride.

To the crude acid chloride was added a mixture of 15.10 g. (0.10 mole) of cumene hydroperoxide and 7.90 g. (0.10 mole) of pyridine, at 10–20° C., with agitation. A white, crystalline peroxide was obtained, in the same manner as described in Example 1. This peroxide was identified as pseudo cumyl peroxy-2-(4-cyclohexylbenzoyl)benzoate, represented by the following structure.

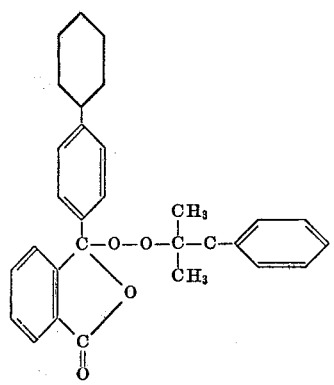

EXAMPLE XII

Preparation of pseudo t-butyl peroxy-2-(5,6,7,8-tetrahydro-2-naphthoyl)benzoate

Following the procedure described in Example I, the chloride of 5,6,7,8-tetrahydro-2-napthoic acid was prepared by reacting 28.00 g. (0.10 mole) of the acid with 17.85 g. (0.15 mole) of thionyl chloride in benzene.

A mixture containing 10.00 g. (0.10 mole) of 90% t-butyl hydroperoxide and 7.90 g. (0.10 mole) of pyridine was added to the crude acid chloride, at 10–20° C., with agitation. Following the procedure of Example 1, a white crystalline peroxide was obtained and identified as pseudo t-butyl peroxy (5,6,7,8-tetrahydro-2-naphthoyl)benzoate as shown below.

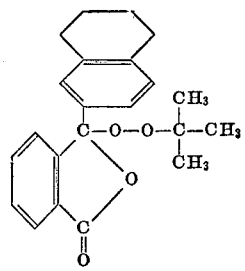

EXAMPLE XIII

Preparation of pseudo 1,1,3,3-tetramethylbutyl peroxy-2-(4-phenylbenzoyl)benzoate Following the procedure described in Example 1, the reaction of 30.20 g. (0.10 mole) of 2-(4-phenylbenzoyl)-benzoic acid with 17.85 g. (0.15 mole) of thionyl chloride in benzene produced the corresponding acid chloride.

To the crude acid chloride was added a mixture of 14.60 g. (0.10 mole) of 1,1,3,3-tetramethylbutyl hydroperoxide and 7.90 g. (0.10 mole) of pyridine, at 10–20° C., with agitation. A white crystalline peroxide was obtained, in the same manner as described in Example I, and identified as the pseudo perester having the following structural formula.

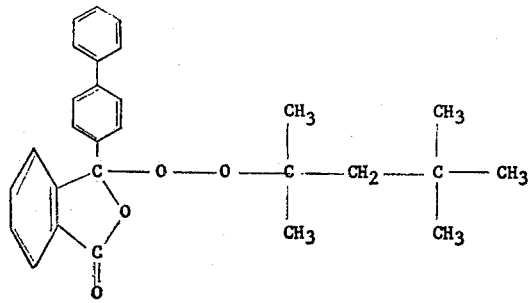

EXAMPLE XIV

Preparation of pseudo cumyl peroxy-2-(1-naphthoyl) benzoate

The chloride of 2-(1-naphthyl)benzoic acid was prepared, in the same manner as described in Example 1, by reacting 27.60 g. (0.10 mole) of the acid with 17.85 g. (0.15 mole) of thionyl chloride in benzene.

A mixture of 15.10 g. (0.10 mole) of cumene hydroperoxide and 7.90 g. (0.10 mole) of pyridine was added to the crude acid chloride, at 10-20° C., with agitation. Then, following the procedure of Example 1, a white crystalline product was obtained and identified as the peroxide, pseudo cumyl peroxy-(2-(1-naphthyl)benzoate represented by the following structure.

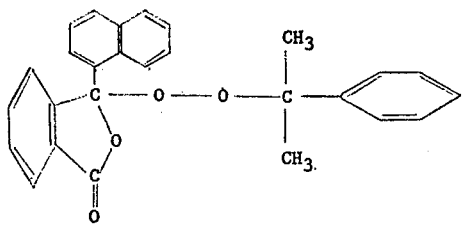

EXAMPLE XV

Preparation of pseudo t-butyl peroxy-2-(4-methoxybenzoyl)benzoate

In the same manner as described in Example I, the chloride of 2-(4-methoxybenzoyl)-benzoic acid was prepared by reacting 25.60 g. (0.10 mole) of the acid with 17.85 g. (0.15 mole) of thionyl chloride in benzene. Similarly, a white crystalline product was obtained from the reaction of the crude acid chloride with 10.00 g. (0.10 mole) of 90% t-butyl hydroperoxide in the presence of 7.90 g. (0.10 mole) of pyridine. This compound was identified as the peroxide, pseudo t-butyl peroxy-2-(4-methoxybenzoyl)benzoate, having the structure as shown below.

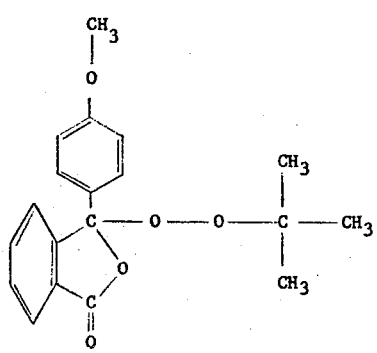

EXAMPLE XVI

Preparation of pseudo t-amyl peroxy-2-(4-t-butoxybenzoyl)benzoate

Following the procedure described in Example I, the reaction of 29.80 g. (0.10 mole) of 2-(4-t-butoxybenzoyl)-benzoic acid with 17.85 g. (0.10 mole) of thionyl chloride in benzene produced the corresponding acid chloride. Then a white crystalline peroxide was obtained by reacting the crude acid chloride with 11.60 g. (0.10 mole) of 90% t-amyl hydroperoxide in the presence of 7.90 g. (0.10 mole) of pyridine. This compound was identified as pseudo t-amyl peroxy-2-(4-t-butoxybenzoyl)benzoate represented by the following structural formula.

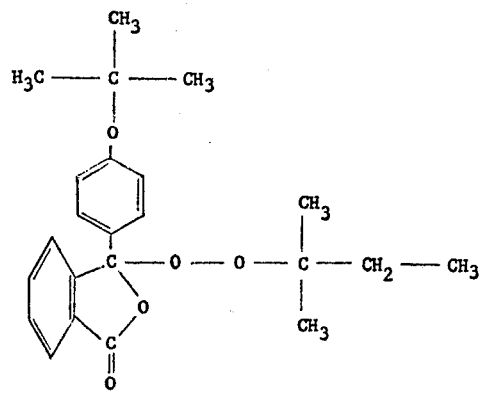

EXAMPLE XVII

Preparation of pseudo cumyl peroxy-2-(4-cyclohexoxybenzoyl)benzoate

Following the procedure described in Example I, the chloride of 2-(4-cyclohexoxybenzoyl)benzoic acid was prepared by the reaction of 32.40 g. (0.10 mole) of the acid with 17.85 g. (0.15 mole) of thionyl chloride in benzene. The reaction of the crude acid chloride with 15.10 g. (0.10 mole) of cumene hydroperoxide in the presence of 7.90 g. (0.10 mole) of pyridine produced a white crystalline peroxide, identified as the pseudo perester, represented by the following structure.

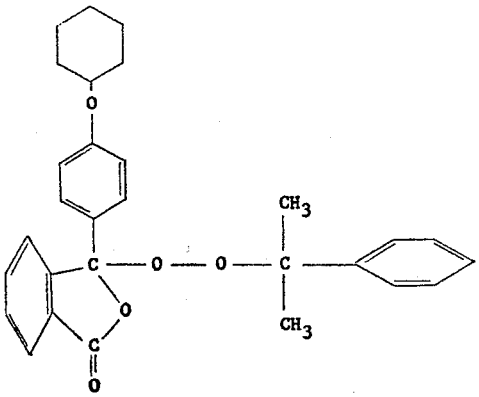

EXAMPLE XVIII

Preparation of pseudo 1,1,3,3-tetramethylbutyl peroxy-2-(4-phenoxybenzoyl)benzoate The procedure described in Example I, was followed. The reaction of 31.80 g. (0.10 mole) of 2-(4-phenoxybenzoyl)benzoic acid with 17.85 g. (0.10 mole) of thionyl chloride in benzene produced the corresponding acid chloride. The crude acid chloride was reacted with 14.60 g. (0.10 mole) of 1,1,3,3-tetramethylbutyl hydroperoxide in the presence of 7.90 g. (0.10 mole) of pyridine to afford a white crystalline peroxide. This compound was identified as the pseudo perester represented by the following structure.

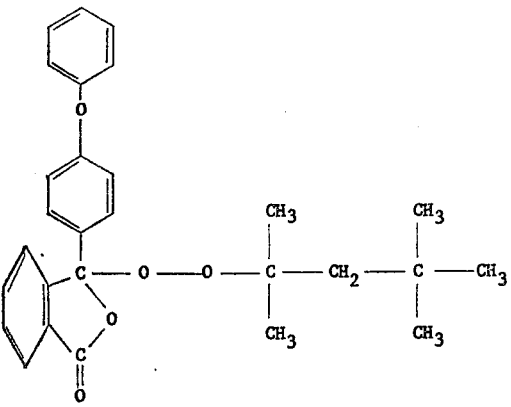

EXAMPLE XIX

Preparation of pseudo t-butyl peroxy-2-(4-chlorobenzoyl)benzoate

The procedure described in Example I, was followed. The chloride of 2-(4-chlorobenzoyl)benzoic acid was produced by the reaction of 26.05 g. (0.10 mole) of the acid with 17.85 g. (0.15 mole) of thionyl chloride in benzene. A white crystalline peroxide was obtained by reacting the crude acid chloride with 10.00 g. (0.10 mole) of 90% t-butyl hydroperoxide in the presence of 7.90 g. (0.10 mole) of pyridine. This compound was identified as the pseudo perester having the following structure.

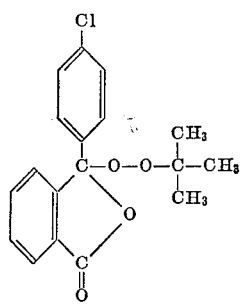

EXAMPLE XX

Preparation of pseudo t-butyl peroxy-2-(2,4-dimethylbenzoyl)benzoate

The procedure of Example I, was followed. The reaction of 25.40 g. (0.10 mole) of 2-(2,4-dimethylbenzoyl)benzoic acid with 17.85 g. (0.15 mole) of thionyl chloride in benzene gave the corresponding acid chloride. The crude acid chloride was reacted with 10.00 g. (0.10 mole) of 90% t-butyl hydroperoxide in the presence of 7.90 g. (0.10 mole) of pyridine. A white crystalline peroxide was obtained and identified as pseudo t-butyl peroxy-2-(2,4-dimethylbenzoyl)benzoate, having the structure as shown below.

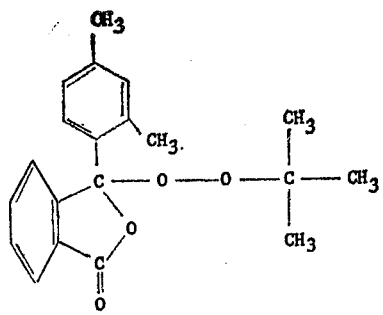

EXAMPLE XXI

Preparation of pseudo t-amyl peroxy-2-(2-methyl-4-cyclohexylbenzoyl)benzoate

The procedure described in Example I, was followed. The chloride of 2-(2-methyl-4-cyclohexylbenzoyl)benzoic acid was prepared by the reaction of 32.20 g. (0.10 mole) of the acid with 17.85 g. (0.15 mole) of thionyl chloride in benzene. Then, the crude acid chloride was reacted with 11.60 g. (0.10 mole) of 90% t-amyl hydroperoxide in the presence of 7.90 g. (0.10 mole) of pyridine, to produce a white crystalline peroxide. This peroxide was identified as pseudo t-amyl peroxy-2-(2-methyl-4-cyclohexylbenzoyl)benzoate having the following structural formula.

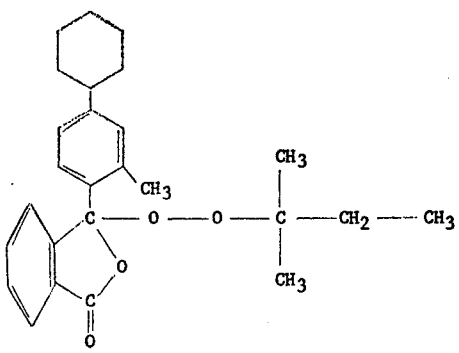

EXAMPLE XXII

Preparation of pseudo cumyl peroxy-2-(2,4-dimethoxybenzoyl)benzoate

The procedure of Example I was followed. The chloride of 2-(2,4-dimethoxybenzoyl)benzoic acid was synthesized by reacting 28.60 g. (0.10 mole) of the acid with 17.85 g. (0.15 mole) of thionyl chloride in benzene. The reaction of the crude acid chloride with 15.10 g. (0.10 mole) of cumene hydroperoxide in the presence of 7.90 g. (0.10 mole) of pyridine produced a white crystalline peroxide. This peroxide was identified as pseudo cumyl peroxy-2-(2,4-dimethoxybenzoyl)benzoate, represented by the following structural formula.

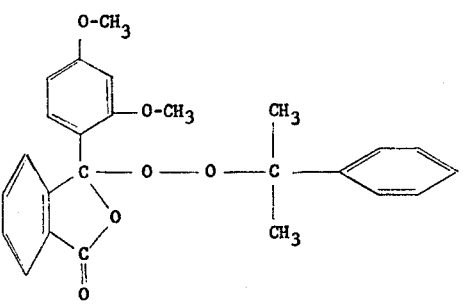

EXAMPLE XXIII

Preparation of pseudo t-butyl peroxy-2-(2,4,5-trimethylbenzoyl)-benzoate

The procedure described in Example I was followed. The chloride of 2-(2,4,5-trimethylbenzoyl)benzoic acid was obtained by reacting 26.80 g. (0.10 mole) of the acid with 17.85 g. (0.15 mole) of thionyl chloride in benzene. The reaction of the crude acid chloride with a mixture of 10.00 g. (0.10 mole) of 90% t-butyl hydroperoxide and 7.90 g. (0.10 mole) of pyridine gave a white crystalline peroxide. The peroxide was identified as the pseudo perester having the structural formula as shown below.

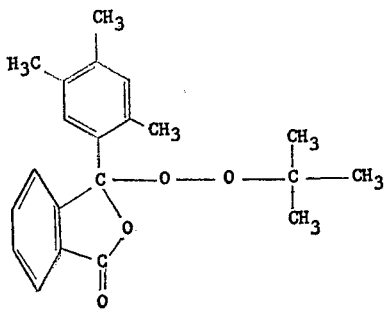

EXAMPLE XXIV

Preparation of pseudo t-butyl peroxy-2-(2,3,4,5-tetramethylbenzoyl)benzoate

The procedure described in Example I was followed. The chloride of 2 - (2,3,4,5 - tetramethylbenzoyl)benzoic acid was synthesized by reacting 28.20 g. (0.10 mole) of the acid with 17.85 g. (0.15 mole) of thionyl chloride in benzene. The crude acid chloride was reacted with 10.00 g. (0.10 mole) of 90% t-butyl hydroperoxide in the presence of 7.90 g. (0.10 mole) of pyridine. A white crystalline peroxide was obtained and identified as the pseudo perester having the following strctural formula

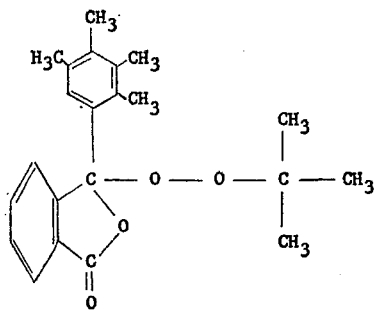

EXAMPLE XXV

Preparation of pseudo t-butyl peroxy-6-methyl-2-(4-t-butylbenzoyl)benzoate

Following the procedure described in Example I, the chloride of 6-methyl-2-(4-t-butylbenzoyl)benzoic acid was prepared by the reaction of 29.60 g. (0.10 mole) of the acid with 17.85 g. (0.10 mole) of thionyl chloride in benzene. The crude acid chloride was reacted with 10.00 g. (0.10 mole) of 90% t-butyl hydroperoxide in the presence of 7.90 g. (0.10 mole) of pyridine. A white crystalline peroxide was obtained and identified as the pseudo perester, represented by the structural formula shown below.

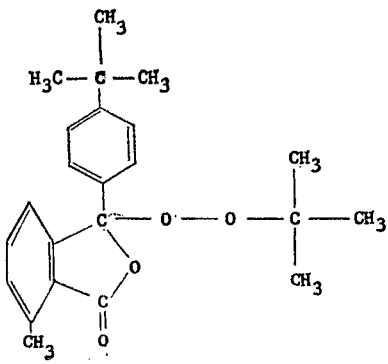

EXAMPLE XXVI

Preparation of pseudo t-amyl peroxy-6-methyl-2-(4-cyclohexylbenzoyl)benzoate

The procedure described in Example I was followed. The chloride of 6-methyl-2-(4-cyclohexylbenzoyl)benzoic acid was prepared by reacting 32.20 g. (0.10 mole) of the acid with 17.85 g. (0.15 mole) of thionyl chloride in benzene. The crude acid chloride was reacted with 11.60 g. (0.10 mole) of 90% t-amyl hydroperoxide in the presence of 7.90 g. (0.10 mole) of pyridine, to produce a white crystalline peroxide. This compound was identified as the pseudo perester having the following structural formula.

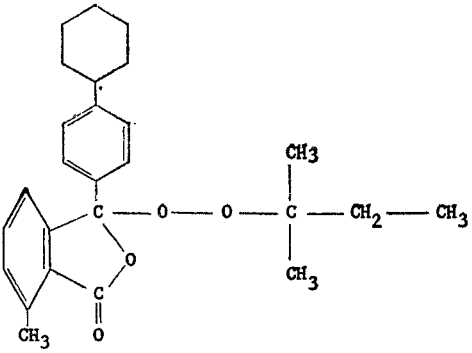

EXAMPLE XXVII

Preparation of pseudo cumyl peroxy-6-methyl-2-(4-phenylbenzoyl)benzoate

Following the procedure of Example I, the chloride of 6-methyl-2-(4-phenylbenzoyl)benzoic acid was synthesized by reacting 31.60 g. (0.10 mole) of the acid with 17.85 g. (0.15 mole) of thionyl chloride in benzene. A white crystalline product was obtained by reaction of the crude acid chloride with 15.10 g. (0.10 mole) of cumene hydroperoxide in the presence of 7.90 g. (0.10 mole) of pyridine. This compound was identified as the pseudo perester having the following structural formula.

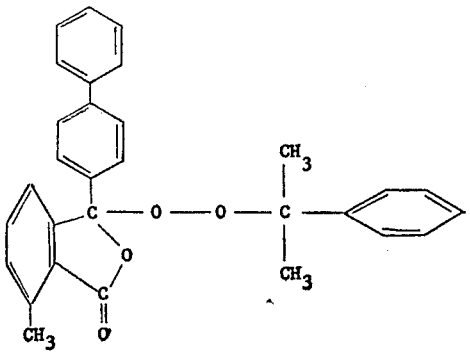

EXAMPLE XXVIII

Preparation of pseudo 1,1,3,3-tetramethylbutyl peroxy-6-methyl-2-(2-methyl-4-ethylbenzoyl)benzoate Following the procedure described in Example I, the chloride of 6-methyl-2-(2-methyl-4-ethylbenzoyl)benzoic acid was prepared by the reaction of 27.90 g. (0.10 mole) of the acid with 17.85 g. (0.15 mole) of thionyl chloride in benzene. Then, the crude acid chloride was reacted with 14.60 g. (0.10 mole) of 1,1,3,3-tetramethylbutyl hydroperoxide in the presence of 7.90 g. (0.10 mole) of pyridine. A white crystalline peroxide was obtained and identified as the pseudo perester, represented by the following structural formula.

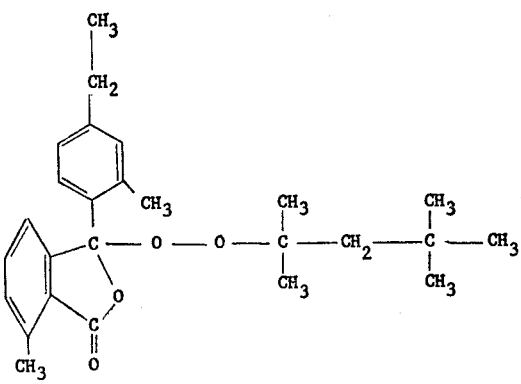

EXAMPLE XXIX

Preparation of pseudo t-butyl peroxy-3,6-dimethyl-2-(4-methylbenzoyl)benzoate

The procedure described in Example I, was followed. The reaction of 26.80 g. (0.10 mole) of 3,6-dimethyl-2-(4-methylbenzoyl)-benzoic acid with 17.85 g. (0.15 mole) of thionyl chloride in benzene yielded the corresponding acid chloride. The crude acid chloride was reacted with 10.00 g. (0.10 mole) of 90% t-butyl hydroperoxide in the presence of 7.90 g. (0.10 mole) of pyridine. A white crystalline peroxide was obtained and identified as the pseudo perester having the following structural formula.

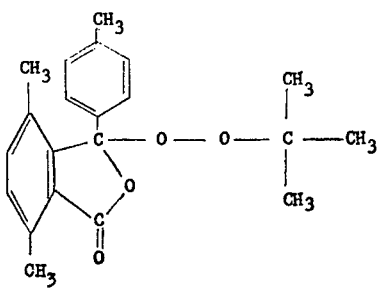

EXAMPLE XXX

Preparation of pseudo t-amyl peroxy-3,6-dimethyl-2-(2-methyl-4-isopropylbenzoyl)benzoate The procedure described in Example I was followed. The chloride of 3,6 - dimethy l- 2-(2-methyl-4-isopropylbenzoyl) benzoic acid was synthesized by reacting 31.00 g. (0.10 mole) of the acid with 7.85 g. (0.15 mole) of thionyl chloride in benzene. The crude acid chloride was then reacted with 11.60 g. (0.10 mole) of 90% t-amyl hydroperoxide in the presence fo 7.90 g. (0.10 mole) of pyridine. A white crystalline product was produced and identified as the pseudo perester, represented by the following structural formula.

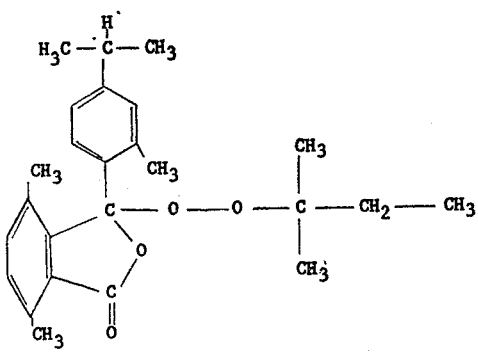

EXAMPLE XXXI

Preparation of pseudo t-butyl peroxy-3,5,6-trimethyl-2-benzoylbenzoate

The procedure described in Example I was followed. The reaction of 26.80 g. (0.10 mole) of 3,5,6-trimethyl-2-benzoylbenzoic acid with 17.85 g. (0.15 mole) of thionyl chloride in benzene afforded the corresponding acid chloride. The crude acid chloride was reacted with a mixture of 10.00 g. (0.10 mole) of 90% t-butylhydroperoxide and 7.90 g. (0.10 mole) of pyridine. A white crystalline peroxide was obtained and identified as the pseudo perester, represented by the following structural formula.

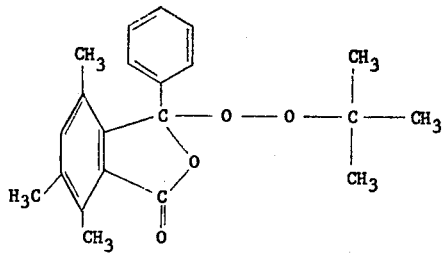

EXAMPLE XXXII

Preparation of pseudo t-amyl peroxy-3,5,6-trimethyl-2-(2-methyl-4-cyclohexylbenzoyl)benzoate The procedure of Example I was followed. The chloride of 3,5,6 - trimethyl - 2 - (2-methyl-4-cyclohexylbenzoyl) benzoic acid was produced by reacting 36.40 g. (0.10 mole) of the acid with 17.85 g. (0.15 mole) of thionyl chloride in benzene. Then, the reaction of the crude acid chloride with 11.60 g. (0.10 mole) of 90% t-amyl hydroperoxide in the presence of 7.90 g. (0.10 mole) of pyridine afforded a white crystalline peroxide, identified as the pseudo perester having the following structural formula.

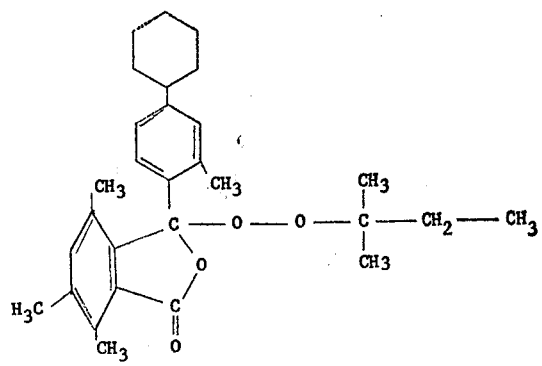

EXAMPLE XXXIII

Preparation of pseudo t-butyl peroxy-3,4,5,6-tetrachloro-2-benzoylbenzoate

Following the procedure described in Example I, the chloride of 3,4,5,6-tetrachloro-2-benzoylbenzoic acid was prepared by reacting 36.40 g. (0.10 mole) of the acid with 17.85 g. (0.15 mole) of thionyl chloride in benzene. The crude acid chloride was then reacted with 10.00 g. (0.10 mole) of 90% t-butyl hydroperoxide in the presence of 7.90 g. (0.10 mole) of pyridine, to form a white crystalline solid peroxide. This compound was identified as the pseudo perester having the following structural formula.

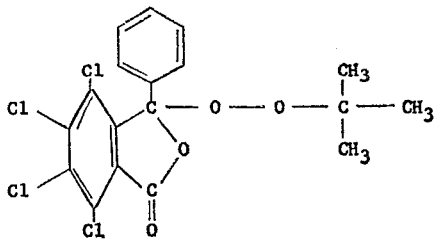

EXAMPLE XXXIV

Preparation of pseudo t-butyl peroxy-3,4,5,6-tetraphenyl-2-benzoylbenzoate

The procedure described in Example I was followed. The reaction of 53.00 g. (0.10 mole) of 3,4,5,6-tetraphenyl-2-benzoylbenzoic acid with 17.85 g. (0.15 mole) of thionyl chloride in benzene afforded the corresponding acid chloride. The crude acid chloride was reacted with 10.0 g. (0.10 mole) of 90% t-butyl hydroperoxide in the presence of 7.90 g. (0.10 mole) of pyridine. A white crystalline peroxide was obtained and identified as the pseudo perester, represented by the following structural formula.

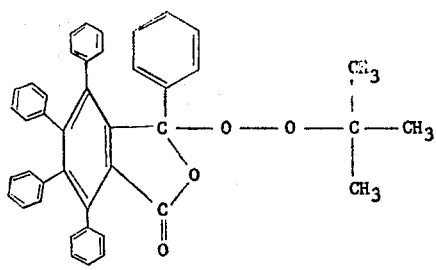

EXAMPLE XXXV

Preparation of pseudo t-butyl peroxy-2-benzoyl-1-naphthoate

In the same manner as described in Example I, 27.60 g. (0.10 mole) of 2-benzoyl-1-naphthoic acid was reacted with 17.85 g. (0.15 mole) of thionyl chloride in benzene to produce the corresponding acid chloride. The crude acid chloride was then treated with 10.00 g. (0.10 mole) of 90% t-butyl hydroperoxide in the presence of 7.90 g. (0.10 mole) of pyridine, to form a white crystalline peroxide, identified as the perester having the following formula.

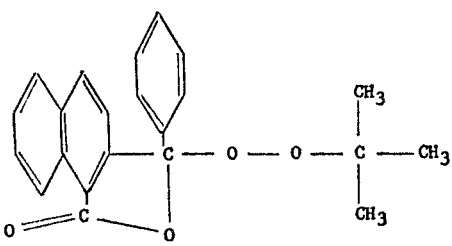

EXAMPLE XXXVI

Preparation of pseudo t-butyl peroxy-9-fluorenone-1-carboxylate

Employing the same procedure as described in Example I, 22.40 g. (0.10 mole of 9-fluorenone-1-carboxylic acid was reacted with 17.85 g. (0.15 mole) of thionyl chloride in benzene to produce the corresponding acid chloride. The reaction of the crude acid chloride with 10.00 g. (0.10 mole) of 90% t-butyl hydroperoxide in the presence of 7.9 g. (0.10 mole) of pyridine afforded a white crystalline solid. This product was identified as the pseudo perester having the following structural formula.

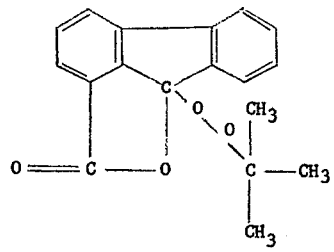

What is claimed is:
1. A compound having the formula

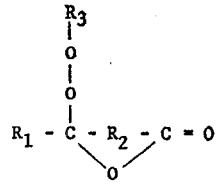

wherein $R_1$ is a member of a group consisting of methyl phenyl, ethyl phenyl, isopropyl phenyl, tert-butyl phenyl, ethyl methyl phenyl, methyl isopropyl phenyl, naphthyl, cyclohexyl phenyl, phenyl phenylene, methoxy phenyl, tert-butoxy phenyl, cyclohexoxy phenyl, phenoxy phenyl, methyl cyclohexyl phenyl, chloro phenyl and ortho phenylene; $R_2$ is a member of a group consisting of ethylene, ortho-phenylene, methyl ortho-phenylene, chloro-orthophenylene, phenyl ortho phenylene, naphthyl and

and $R_3$ is a member of the group consisting of tert-butyl, tert-amyl, cumyl and tetra methyl-butyl.

2. A compound having the formula

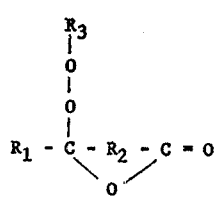

wherein $R_1$ is a member of a group consisting of methyl, phenyl and methylphenyl; $R_2$ is a member of a group consisting of ethylene and orthophenylene and $R_3$ is a member of a group consisting of t-butyl, t-amyl and cumyl.

3. A compound according to claim 2 wherein $R_1$ is methyl.

4. A compound according to claim 2 wherein $R_1$ is phenyl.

5. A compound according to claim 2 wherein $R_1$ is methylphenyl.

6. A compound according to claim 2 wherein $R_2$ is ethylene.

7. A compound according to claim 2 wherein $R_2$ is ortho-phenylene.

8. A compound according to claim 2 wherein $R_3$ is t-butyl.

9. A compound according to claim 2 wherein $R_3$ is t-amyl.

10. A compound according to claim 2 wherein $R_3$ is cumyl.

11. A compound according to claim 2 which is 5-t-butylperoxy-5-methyl-2-oxo-2,3,4,5-tetrahydrofuran.

12. A compound according to claim 2 which is 5-t-butylperoxy-2-oxo-5-phenyl-2,5-dihydro-3,4-benzofuran.

13. A compound according to claim 2 which is 5-t-amylperoxy-5-methyl-2-oxo-2,3,4,5-tetrahydrofuran.

14. A compound according to claim 2 which is 5-cumylperoxy-5-methyl-2-oxo-2,3,4,5-tetrahydrofuran.

15. A compound according to claim 2 which is 5-t-butylperoxy-2-oxo-5-(2 methyl phenyl)-2,5-dihydro-3,4-benzofuran.

References Cited
UNITED STATES PATENTS 3,557,147   1/1971   Petracek et al. _____ 260—343.3

NICHOLAS S. RIZZO, Primary Examiner

A. M. T. TIGHE, Assistant Examiner

U.S. Cl. X.R.

252—426; 260—89.3, 89.5, 93.5, 94.9, 343, 343.5, 343.6